Patented June 15, 1937

2,083,821

UNITED STATES PATENT OFFICE 2,083,821

DETERGENT COMPOSITION

Waldemar Blech, Cleveland, Ohio, assignor to Thurlow G. Gregory

No Drawing. Application September 8, 1936, Serial No. 99,814

2 Claims. (Cl. 87—5)

This invention relates to a detergent composition especially adapted for the removal of coatings of synthetic resins and similar materials as well as cellulose lacquer from the skin and without appreciable injury thereto. It is well known that regular commercial cellulose lacquer solvents as hereinafter mentioned when acting alone will not adequately dissolve synthetic resins and are injurious to the skin. When attempt is made to use such solvents alone or with water or with soap and water to remove synthetic resins from the skin they are not effective, are costly and decidedly harmful to the skin.

It is also true that when toluol xylol and mixtures thereof (which are solvents for synthetic resins and which are incompatible with water and which are harmful to the skin) are mixed with regular commercial solvents for cellulose lacquer the mixture is harmful to the skin, is not compatible with glycerine and an aqueous soap solution and will not unify therewith even upon continued agitation.

The principal object of this invention is to provide a relatively harmless composition of such ingredients which shall be effective for the removal of synthetic resins, cellulose lacquer and other materials from the skin as well as such other substances or stains as can be removed by ordinary soap. A further object of the invention is to provide a stable and for all practical purposes a permanent emulsion or unification containing soap, water, glycerine, one or more cellulose lacquer solvents and one or more synthetic resin solvents in amounts adequate to remove either synthetic resins, cellulose lacquer or both from the skin without appreciable injury thereto. I have discovered that alkali is an effective blending agent for this purpose.

Other and more limited objects will become apparent as the description proceeds. In order that any person skilled in the art to which this invention relates may be able to compound and use detergent compositions embodying my invention, I give the following illustrative formulae.

No. 1

| | Pounds |
|---|---|
| Toluol | 13½ |
| Ethyl acetate | 9 |
| Glycerine | 6½ |
| Sodium carbonate | 2 |
| Soap chips | 15 |
| Diatomaceous earth | 14 |
| Sand | 18 |
| Water | 21¾ |
| Oil of sassafras | ¼ |
| | 100 |

No. 2

| | Pounds |
|---|---|
| Toluol | 21 |
| Ethyl acetate | 16 |
| Glycerine | 6 |
| Sodium carbonate | 4 |
| Soap chips | 9 |
| Diatomaceous earth | 7 |
| Sand | 10 |
| Water | 24 |
| Carbon tetrachloride | 3 |
| | 100 |

No. 3

| | Pounds |
|---|---|
| Toluol | 7 |
| Xylol | 6½ |
| Butyl acetate | 4½ |
| Pentyl acetate | 4½ |
| Glycerine | 6½ |
| Sodium hydroxide | ⅜ |
| Soap chips | 15 |
| Diatomaceous earth | 14 |
| Sand | 19⅝ |
| Water | 21¾ |
| Oil of sassafras | ¼ |
| | 100 |

No. 4

| | Pounds |
|---|---|
| Toluol | 13½ |
| Butyl acetate | 4½ |
| Pentyl acetate | 4½ |
| Carbon tetrachloride | 3 |
| Glycerine | 8 |
| Sodium carbonate | 4 |
| Soap chips | 15 |
| Diatomaceous earth | 10½ |
| Sand | 16 |
| Water | 21 |
| | 100 |

From the above it will be noted that in each case there is provided one or more solvents for synthetic resins, one or more solvents for cellulose lacquer, glycerine and in some formulae carbon tetrachloride is included, the carbon tetrachloride being compatible with the herein described ingredients and being desirable but not necessary in use. It is to be understood that other cellulose lacquer solvents may be employed instead of those indicated in the formulae, such for example as ethyl propionate, ethylene-glycol-mono-ethyl-ether acetate and ethylene-glycol-mono-butyl-ether acetate. In each case glycerine, soap and water are employed. In addition to these basic ingredients and the usual perfume, abrasive and filler, there is provided in each case one or more emulsifying or blending ingredients, such for example as sodium carbonate, and sodium hydroxide.

When carbon tetrachloride is present, less alkali may be used to blend the ingredients. The presence of the glycerine protects the skin. It will be observed that the alkali is free alkali and is over and above that required to form soap from the oleic or like acid.

In producing the novel composition, a quantity of soap (the sodium or potassium salt of stearic, oleic or palmitic acid) is dissolved in water and the abrasive material is added while the solution is kept in agitation, whereupon glycerine and the alkali and, if desired, a suitable perfume are introduced, a quantity of filler such as diatomaceous earth or wood flour are added and thereafter the solvents and, if desired, the carbon tetrachloride are slowly introduced. Finally the remainder of the filler is added with agitation and the emulsion is left for a few hours after which it sets into a paste and is then ready for use. If the filler, abradant and perfume, or any of them are desired to be omitted, the same procedure may be followed leaving out one or more of these last named ingredients, any and all of which are unessential.

It is believed to be clear from the description and examples given that a wide variety of formulae may be used within the workable ranges of proportions of the ingredients shown in the herein described invention and for brevity the following ranges are given of the proportions of the essential ingredients known by me to be effective for all of the ingredients in some combination within the ranges and from which those skilled in the art may readily compound this detergent using the solvent or solvents the glycerine, the emulsifying or blending agent or agents and the other ingredients in the ratio best suited to his needs:

| | Parts by weight |
|---|---|
| Synthetic resin solvent from the group consisting of toluol, xylol and mixtures thereof, approximately | 8½ to 60 |
| Cellulose lacquer solvent from the group consisting of ethyl acetate, butyl acetate, pentyl acetate, ethyl propionate, ethylene-glycol-mono-ethyl-ether acetate, ethylene-glycol-mono-butyl-ether acetate and mixtures thereof, approximately | 1½ to 40 |
| Soap, approximately | 8 to 20 |
| Glycerine, approximately | 5½ to 16 |
| Water, approximately | 15 to 60 |
| Carbon tetrachloride, 0 to approximately | 8 |
| An alkali from the group consisting of sodium carbonate, sodium hydroxide and mixtures thereof, approximately | ⅛ to 20 |
| Filler, abradant, odoriferous matter | optional |

By the term synthetic resin when used herein I mean resins of which the glycerol phthalate type of synthetic resins is an example.

This invention includes the features of bringing about unification of these incompatible substances and also using solvent substances in sufficient quantity to dissolve synthetic resin or cellulose lacquer or both and remove it without appreciable injury to the skin.

These solvents which are not miscible to a practical degree with water and glycerine or an aqueous soap solution and glycerine and which therefore cannot be separately or successively used without injury to the skin, or are not readily rinsed from the hands, but if used must remain and evaporate with injury to the skin become in this composition fully unified as well as fully miscible with water and rinsible by water as well as harmless to the skin.

These ingredients will, therefore, accomplish in combination what they will not accomplish separately or successively.

While the proportions given in the illustrative formulae and in the approximate range of proportions formula are not sharply critical, they are, so far as my experiments indicate, the optimum proportions and if departed from too far will result in an unstable emulsion, that is, one which is less permanent or a product that may be harmful to the skin. It is possible to make an emulsion somewhat less permanent than would result from the exact proportions given without destroying the commercial value of the product. Care should be taken, however, to provide such stability as will endure during the normal time which may be expected to elapse between manufacture and consumption. I, therefore, contemplate and desire to cover in the spirit of the claims any proportions of ingredients which do not depart from the optimum enough to destroy the commercial value of the product.

When toluol and xylol are used herein, they are intended to mean toluene and xylene.

This application is a continuation in part of my application Serial No. 606,294, filed April 19, 1932, issued as Patent No. 2,056,916, Oct. 6, 1936.

While I have described certain illustrative formulae, I wish it understood that my invention is not limited to particular ingredients and proportions except in accordance with the spirit and scope of the appended claims.

Having thus described my invention, what I claim is:

1. A relatively harmless, water rinsible detergent composition for the removal of glycerol phthalate synthetic resins and cellulose lacquer from the skin and consisting essentially of:

| | Parts by weight |
|---|---|
| Synthetic resin solvent matter from the group consisting of toluol, xylol and mixtures thereof, approximately | 8½ to 60 |
| A highly volatile cellulose lacquer solvent and selected from the group consisting of ethyl acetate, butyl acetate, pentyl acetate, ethyl propionate, ethylene-glycol-mono-ethyl-ether acetate, ethylene-glycol-mono-butyl-ether acetate and mixtures thereof, approximately | 1½ to 40 |
| Soap, approximately | 8 to 20 |
| Glycerine, approximately | 5½ to 16 |
| Carbon tetrachloride 0 to approximately | 8 |
| Water, approximately | 15 to 60 |
| An alkali from the group consisting of sodium carbonate, sodium hydroxide and mixtures thereof, approximately | ⅛ to 20 |

2. A relatively harmless, water rinsible detergent composition for the removal of glycerol phthalate synthetic resins and cellulose lacquer from the skin and consisting approximately of:

| Toluol | 13½ |
|---|---|
| Pentyl acetate | 4½ |
| Butyl acetate | 4½ |
| Carbon tetrachloride | 3 |
| Glycerine | 8 |
| Sodium carbonate | 4 |
| Soap | 15 |
| Diatomaceous earth | 10½ |
| Sand | 16 |
| Water | 21 |

WALDEMAR BLECH.